HIGH-ENERGY MAGNETIC MATERIAL

Filed April 8, 1955 6 Sheets-Sheet 1

Inventors:
Thomas O. Paine
Lewis I. Mendelsohn
Fred E. Luborsky
by, Richard E. Hosley
Their Attorney Magnification 100,000 X Magnification 100,000 X Inventors:
Thomas O. Paine
Lewis I. Mendelsohn
Fred E. Luborsky
by, Richard E. Hosley
Their Attorney Magnification 100,000 X Magnification 100,000X Inventors:
Thomas O. Paine
Lewis I. Mendelsohn
Fred E. Luborsky
by, Richard E. Hosley
Their Attorney March 7, 1961 T. O. PAINE ET AL 2,974,104

HIGH-ENERGY MAGNETIC MATERIAL

Filed April 8, 1955 6 Sheets-Sheet 4

Magnification 100,000 X

Magnification 100,000 X

Inventors:
Thomas O. Paine
Lewis I. Mendelsohn
Fred E. Luborsky
by, Richard E. Hosley
Their Attorney Inventors:
Thomas O. Paine
Lewis I. Mendelsohn
Fred E. Luborsky
by, Richard E. Hosley
Their Attorney March 7, 1961 T. O. PAINE ET AL 2,974,104

HIGH-ENERGY MAGNETIC MATERIAL

Filed April 8, 1955 6 Sheets-Sheet 6

Inventors:
Thomas O. Paine
Lewis I. Mendelsohn
Fred E. Luborsky
by, Richard E. Hosley
Their Attorney United States Patent Office 2,974,104

Patented Mar. 7, 1961

2,974,104

HIGH-ENERGY MAGNETIC MATERIAL

Thomas O. Paine, Nahant, Lewis I. Mendelsohn, Lynn, and Fred E. Luborsky, Stoneham, Mass., assignors to General Electric Company, a corporation of New York Filed Apr. 8, 1955, Ser. No. 500,078

17 Claims. (Cl. 252—62.5)

The present invention relates to magnetic materials, particularly high-energy permanent magnet materials, and to methods for making the same.

Widespread use of magnetic and permanent magnet materials in sensitive instruments, electrical apparatus, and other common equipment has occasioned demand for more effective and less costly magnetic materials. For example, the steel magnets which were once satisfactory during the infancy of many arts have been found to lack the capacity and effectiveness required for wider industrial application today. However, the search for materials having improved magnetic characteristics has led in the direction of relatively scarce and expensive elements, and in the direction of costly manufacturing processes. By way of illustration, critical metals, such as cobalt, nickel, and platinum, are utilized in some magnet alloys which have high coercive forces and large energy products.

As a principal element for a magnetic material, iron is of course particularly desirable because of its cheapness and abundance. Efforts heretofore directed to the greater use of this element in magnets have included alloying and the formation of fine particle powders, although the coercive forces and energy products obtained have been disappointing. Other elements and their alloys have thus appeared to be more promising.

It is one of the objects of this invention to provide novel magnetic material exhibiting vastly improved magnetic properties.

Further, it is an object to provide a permanent magnet material comprising iron in which the constituents include particles shaped, oriented, and arranged so as to produce superior magnetic properties.

An additional object of this invention is to provide a novel method for producing magnetic material exhibiting highly improved magnetic effects.

Still further, it is an object to provide an improved magnetic material comprising a plurality of magnetic materials having a predetermined structure resulting in superior magnetic properties.

Another object is to provide a novel magnetic material which can be made simply and at low cost, without sacrifice of magnetic properties.

Practice of our invention involves fine-particle permanent magnet materials, the individual particles each being distinctly elongated and having transverse dimensions so minute as to preclude the appearance of more than a single magnetic domain. However, that the full novel aspects of the present teachings may best be perceived, it should first be understood that powdered magnet materials comprised of relatively large crystals, particles, flakes, etc., have long been known, both in permanent magnet and magnetic core constructions. And, further, prior efforts have resulted in reported production of sub-microscopic spherical particles capable of accommodating but a single magnetic domain. Use of the aforementioned large-size crystals or other particles has been dictated largely because of reduced eddy-current losses, in the case of magnetic cores, and in the instance of permanent magnets, because somewhat improved magnetic directionality and a conservation of critical materials can result from a molding of magnetic particles in a suitable binder material with desired orientations. On the other hand, use of sub-microscopic single-domain spherical particles of magnetic material has been proposed for the principal reason that coercive force of each particle is inherently greater than would be realized with a particle larger than the size of a single magnetic domain.

Theory applicable to the latter type of materials also aids in understanding the present teachings of improved magnetic materials and is next reviewed briefly. According to present well-known theory, ferromagnetic materials are considered to comprise "domains," each of which is a grouping of atoms in which the magnetic moments of the atoms are parallel or aligned one with the other. Just as crystals of magnetic material, such as iron and the like, magnetize more readily in the direction of the edges of the cubic crystal, so the direction of easy magnetization or magnetic directionality of domains which make up the crystal has been shown to follow the easy crystal magnetization direction. This characteristic of crystals to magnetize along one set of axes more readily than along the others is known as crystal anistropy as opposed to crystal isotropy wherein the crystal would magnetize as readily along all axes. When the moments of the numerous domains in a magnetic material are so oriented that they cancel one another, there is said to exist a state of zero external induction (B). The material is then said to be unmagnetized. Induced magnetism is in turn produced by a magnetizing force (H) and the ratio of B to H is known as permeability, which is a measure of the ability of a material to magnetize. In the well known hysteresis curve in which the magnetic flux density or induction (B) is plotted as ordinate against the magnetizing force (H), as abscissa, the value of the magnetizing force at which the induction is zero is known as the coercive force ($Hc$). In other words, the coercive force ($Hc$) is the demagnetizing force required to reduce the magnetic induction (B) to zero, and this force can be used as one measure of the magnetic quality of the material. Another factor often used to express the quality of a magnet material is the so-called maximum energy product. This maximum energy product (BH) is the product of the flux density (B) and the demagnetizing force (H) taken at the point on the hysteresis loop where this product is a maximum.

Returning once again to magnetic domains, the boundaries between such domains are not sharp, atomically speaking, but are, on the other hand, some atoms thick and form a so-called Bloch wall. When the adjacent magnetic domains have magnetic moments of different directions, the atoms in the connecting wall are successively more aligned in one direction than the other as one proceeds across the wall width so that the transition between the domains is gradual in an atomic sense. The application of even low magnetic fields to a specimen of magnetic material will cause it to exhibit a slight magnetization, because the domain boundaries shift in such a way that magnetic domains favorably oriented with respect to the applied field grow at the expense of their less favorably oriented neighboring domains. A much stronger applied field is required to increase the specimen magnetization, however, because the directions of magnetization of magnetic domains must next be brought into alignment with the direction of the applied field. As has been noted earlier, domain magnetization directions are in certain relationships with crystal directions, and the large crystal anistropy forces thus strongly oppose other alignment patterns. Removal of the intense applied field is attended by re-alignment of the domain magnetizations with the crystal directions, due to the crystal anistropy forces, although the domain boundaries will remain fixed in their shifted positions and a relatively small permanent magnetization is achieved.

The aforesaid domain boundary movements which enable even relatively weak applied fields to change specimen magnetization are disadvantageous. This should be apparent when it is recognized that optimum permanent magnets are those having strong magnetizations which cannot be disturbed by small fields. If, then, a specimen is comprised of numerous isolated particles each too small to accommodate a domain boundary, the effects of boundary shifts will be absent and the coercive force will be proportional to the relatively large crystal anisotropy forces. Only external applied fields intense enough to alter particle magnetizations against the crystal anisotropy forces could weaken a permanent magnet of this type. Fortunately, the domain boundaries, or regions of gradual transition in magnetic orientation of atoms between adjacent magnetic domains, have thicknesses comfortably in excess of diameters of fine spherical particles which can actually be produced in quantities permitting their agglomeration into usable magnets. For example, the domain boundary thickness is 840 angstroms (1 angstrom=1/100,000,000 cm.) in iron, and 2,900 angstroms in nickel. Magnetic material particles each too small to accommodate a domain boundary are further incapable of occasioning such boundaries when compacted into a mass, provided the individual particles are separated from one another by non-magnetic coatings or binders.

In the case of iron, one of the most satisfactory techniques for producing substantially spherical fine particles of the requisite sub-microscopic diametric dimensions has involved electrodeposition of iron into mercury, this approach having been investigated over a century ago and having been reported as yielding iron with an appreciable coercive force more than a half-century ago. Other suitable techniques are known, one illustration of which is the low temperature reduction of iron salts. While iron is preferred as a permanent magnet material for the major reasons that it is inexpensive, plentiful, and readily lends itself to production in fine-particle form by processes such as those mentioned, it is unfortunately possessed of only low crystal anisotropy forces. Because of these low crystal anisotropy forces in iron, that is, crystal forces which tend to hold the magnetic moments of iron atoms in predetermined directions, the coercive force exhibited by an iron mass comprised of fine round particles, which is proportional to crystal anistropy force, is also low and the agglomerated particles form a relatively poor magnet. Accordingly, other materials having inherently higher crystal anisotropy forces have appeared to offer the optimum potentialities in magnet construction.

Processes utilized in making fine iron particles of less than single magnetic domain size have occasioned particle configurations which were generally spherical, and in compacting such particles, it has been necessary to keep them from joining and reaching resultant sizes accommodating the dimensions of domain boundaries for the material as has been noted hereinbefore. In accordance with the present teachings, however, the generally spherical shape of iron particles is specifically avoided, and instead, these are produced in highly elongated form wherein the longitudinal dimension may actually be far in excess of the domain boundary dimension of the material. It will be recognized, then, that our fine-particle iron magnet material is not restricted to dimensions all less than the domain boundary dimension, and the particles are preferably of elongations much greater than this dimension. Uniquely, our critically-elongated particles provide vastly greater coercive force than obtains from the relatively low crystal anisotropy forces of iron, and the enormously improved magnetic properties are principally attributed to the shape anisotropy. We are thus successful in realizing the advantages of utilizing iron as a principal magnet material, in overcoming the limits heretofore set by low crystal anisotropy forces, and in creating permanent magnets having improved magnetic characteristics.

By way of illustration of the limitations of prior single-domain iron particles, it is noted that such iron particles having substantially spherical configurations and depending mainly upon crystal anisotropy forces yield maximum coercive forces only of the order of 1,000 oersteds. Elongated iron particles as taught by us realize a remarkable coercive force of about 2,100 oersteds, however. While this increase in particles coercive force is itself of major importance, it is at least equally significant that our particles have been readily aligned, or directionalized, in finished magnetic material. Heretofore, substantial directionalization could not be achieved because the known essentially-round iron particles could not be caused to align in a manner enhancing the magnetic properties in any one direction to any important degree. With material having magnetically-aligned elongated iron particles, the shape of the demagnetization curve is advantageously altered in a manner which occasions a greater maximum energy product (which is the criterion of magnetic effectiveness, or the so-called $BH_{max}$) than can be produced with the unaligned substantially round iron particles. Thus, while prior round iron particles have yielded a maximum energy product of only about 1,100,000 gauss-oersteds, the aligned elongated iron particles of our teaching have readily achieved a surprising energy product of about 2,500,000, with the theoretical upper limit being aboutt 40,000,000 gauss-oersteds.

In making one suitable permanent magnet material, we first produce fine particles of iron which have a median elongation ratio of at least 1.5 to 1, and which have dimensions in directions transverse to the direction of elongation about the same as or less than the domain boundary dimension of iron (about 840 angstroms). These particles are next coated with material which prevents their joining when packed together, and a compacting is performed to create physically and magnetically strong magnet members. Preferably, the elongated particles are obtained by a critical electrodeposition of iron into a liquid mercury cathode through an electrolyte. Although prior electrodepositions of iron into mercury had been known up to a century ago, this general approach had yielded only substantially spherical iron particles of the aforementioned poor qualities. However, we have discovered that by occasioning a particularly quiescent interface between the electrolyte and liquid mercury cathode, and by employing certain other controlled plating conditions, the desired critically elongated particles are produced in great abundance, and the undesired spherical particles can appear only in negligible quantities.

By way of a summary account of one aspect of this invention, we electroplate iron into a liquid mercury cathode from an iron chloride electrolyte, using a consumable ingot iron anode, the interface between the electrolyte and liquid cathode being preserved sufficiently quiescent to occasion unique formation of elongated particles of iron having a median elongation ratio of at least 1.5 to 1 and having at least half of the particles possessed of an elongation ratio of at least 2 to 1.

Application of a magnetic field to the liquid mercury, as with a permanent magnet dipped into the cathode, permits extraction of a putty-like mass of fine particles and mercury. The iron-mercury slurry is then heated for a few minutes at about 200° C. and, after cooling to room temperature, a trace of another metal, such as tin, is added. Removal of iron from the mercury is continued by oxidizing the iron, with air, for example, and the resulting powder is then washed and vacuum- or hydrogenbaked at a low temperature to eliminate the last traces of mercury. A plastic or non-magnetic metal filler is next mixed with the elongated iron particles; the particles are aligned by a magnetic field; and the mixture is presssed into a firm magnet structure. The magnetic behavior of the finished magnet is distinctly superior to that evidenced by other powdered iron magnets wherein crystal anistropy forces are dominant, and it is clear that shape anisotropy of the critically elongated iron particles is responsible for the unusual improvement.

Although the features of this invention which are believed to be novel are set forth in the appended claims, greater detail and further objects and advantages thereof may be most readily comprehended through reference to the following description taken in connection with the accompanying drawings, wherein:

Figure 1:
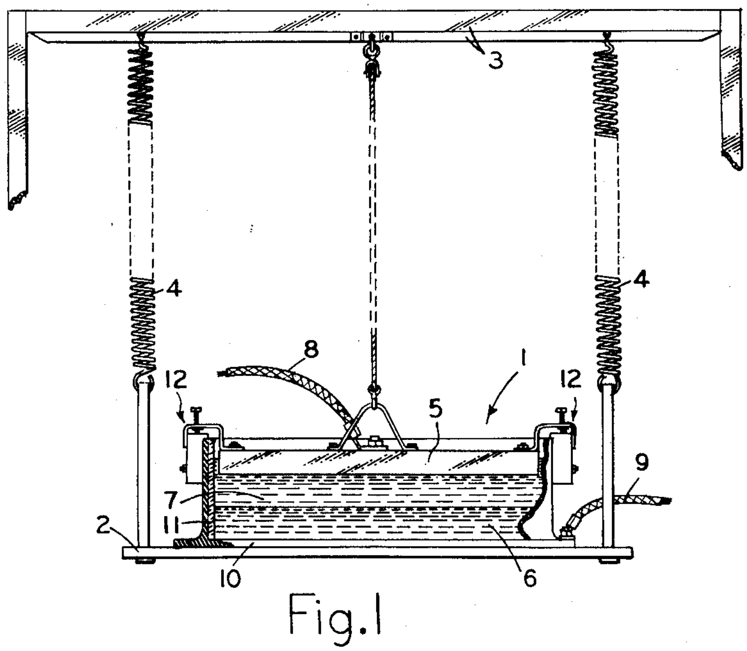
Figure 1 is a partly-sectionalized pictorial view of one electrodeposition apparatus for producing elongated fine-particle iron magnet material.

One apparatus for the electrodeposition of iron into mercury under conditions occasioning growth of critically-dimensioned elongated iron particles is illustrated in Figure 1 as including an electroplating cell 1 mounted on a base 2 which is suspended from a frame 3 by coil springs 4. The cell itself includes a consumable iron ingot anode 5, a pool of liquid mercury 6 serving as a cathode, and a liquid electrolyte 7 intermediate and contacting the anode and cathode and containing iron ions. Iron chloride is a suitable electrolyte, although solutions of other ferrous salts are useful, also. For example, iron sulphate or iron nitrate may be used. Cable 8 couples anode 5 with the positive terminal of a D.C. source (not shown) and cable 9 completes the circuitry of cathode 6 with the current source, through the conducting cell wall 10 which the mercury cathode contacts. Glass or other insulating liners, such as that designated by reference character 11, may be employed to preclude deposits of iron on the side walls of the cell, and insulated adjusting brackets 12 enable adjustable spacing of the iron anode in relation to the mercury pool.

Heretofore, electroplating of iron into mercury has principally yielded the substantially spherical particles mentioned earlier, and such elongated particles as may have been produced have appeared only by accident, and only in minute quantities, and only in such a low-percentage mixture with substantially spherical particles that the benefits of shape anisotropy could not be realized. Our initial efforts with electrodeposition met with similar failings which appeared to render this approach wholly unsuitable for the creation of critically-elongated iron particles. The practice by which, ultimately, we radically altered the plating phenomena to achieve abundant yields of the desired particles includes the practice of preserving a quiescent interface between the electroplating electrolyte and the liquid cathode. It has also been found particularly beneficial to maintain the mercury surface free of impurities and foreign matter. The spring suspension represented in Figure 1 comprises one means for producing the condition whereby vibrations and other mechanical disturbances are without effect upon the calm electrolyte-cathode interface during electrodeposition. It should be understood that, while this practice is readily observed, it is nevertheless highly critical and surprising in its effects. In this last connection, recognition should be made of the fact that those skilled in electrodeposition theory and technique have sought to realize just the opposite environment, namely, that of changing interface conditions. Mixing, stirring, vibration, and other devices for accomplishing rapid relative motion between the electrolyte and cathode surfaces have earlier been viewed as highly advantageous, it being appreciated that the electrolyte near the cathode will tend to become depleted of ions during the plating process and that plating will be greatly facilitated by circulating fresh electrolyte with plentiful supplies of ions near the cathode where the ions can receive electrons and become transformed into metal atoms with great rapidity. Further, motion of the cathode itself tends to inhibit crystal growth of the plated metal, and has earlier been deemed beneficial in realizing dispersed fine metal deposits. These disturbances are specifically avoided in our process, however, and a quiescent interface is maintained throughout the electrodeposition to realize particles having the critical shape anisotropy effects. Scrupulously clean mercury surfaces which facilitiate deposition of the desired particles may be achieved by the addition of acid to the electrolyte, suitable acids being exemplified by hydrochloric acid in the case of an iron chloride electrolyte, sulphuric acid in the case of iron sulphate, and nitric acid in the case of an iron nitrate electrolyte.

Hydrated iron ions appearing in the electrolyte 7, which preferably comprise an iron salt dissolved in water, flow steadily to the interface between the electrolyte and the molten mercury cathode 6, under influence of the potential applied between the cathode and anode 5. The applied potential occasions an arrival rate of such ion atoms of about $5\times10^{17}$ atoms per square centimeter per second, and as these ions receive electrons from the mercury, they lose their positive charges and associated water molecules. Although charged iron atoms cannot nucleate and grow into metal particles while in the ionized state, they are free to do so when they are supplied with electrons and appear in a certain degree of supersaturation in the liquid mercury cathode. Under conditions of high and steady flow of the iron ions to the cathode, there is a maximum concentration of iron atoms in the mercury near the mercury-electrolyte interface, the concentration falling off rapidly with increasing distance from the interface and depending upon such factors as atom arrival rate, the solubility of iron in mercury, rate of diffusion of iron in mercury, and the nucleation and growth rates of iron particles in regions of various concentrations. The probability of nucleating iron particles increases with the degree of supersaturation of iron in the mercury, and will be highest at the interface where a high degree of supersaturation is to be expected because of the high rate of arrival of iron atoms. Numerous iron particles are nucleated simultaneously, each depleting the mercury of iron atoms in its immediate vicinity as it grows and thereby hindering further nucleation in the depleted volumes. The mercury cathode may conveniently be considered to behave as though consisting of numerous minute and discrete cathodes each of which receives iron atoms, becomes supersaturated, and nucleates one particle. Under certain conditions, for example, each square centimeter of cathode area yields about $10^{12}$ of these iron particles per second, each particle containing about 500,000 atoms. As each iron particle completes its growth, it moves in the mercury away from the interface, thus permitting the region behind it to become saturated again and nucleate a new particle. As the atom arrival rates are increased, continuous electroplated sheet formation would ultimately be realized. However, at arrival rates before this plating condition occurs, the environment is favorable to the formation of elongated iron particles.

Figure 2:
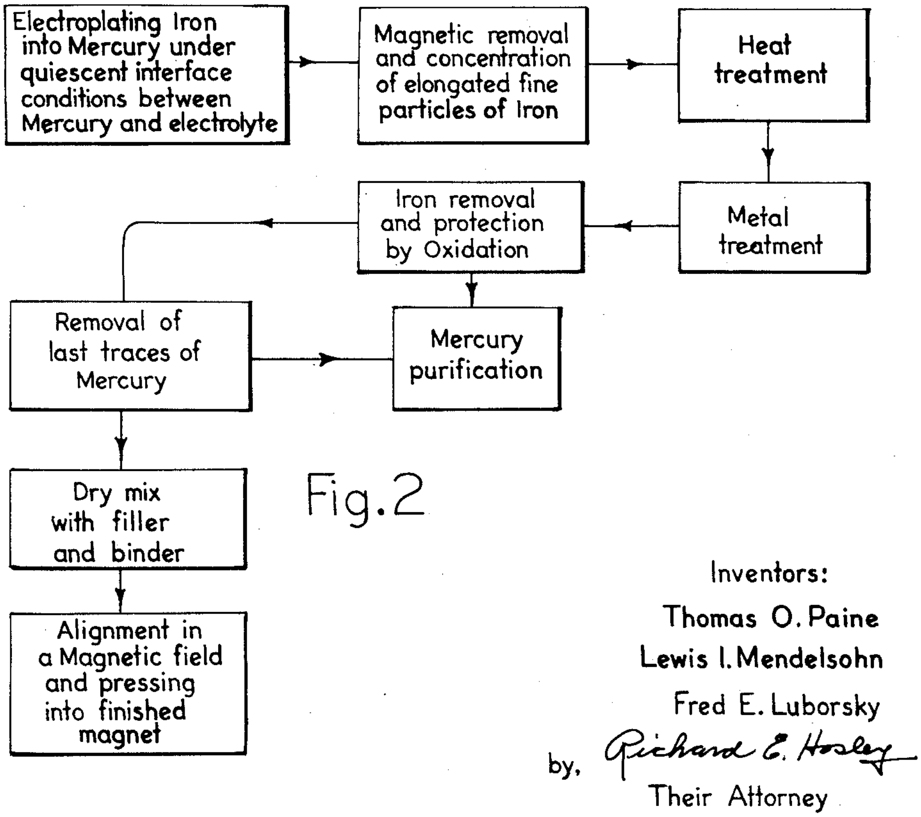
Figure 2 is a block diagram setting forth a process for the practice of our invention.

The block-diagrammed steps of one magnet manufacturing arrangement utilizing our teachings is presented in Figure 2. Initially, elongated iron particles of the aforementioned critical shape are prepared by electroplating iron into mercury under quiescent interface conditions between the mercury and electrolyte. Next, the elongated particles are magnetically removed from the mercury pool and concentrated into a mass. One simple expedient for accomplishing this has been to position a permanent magnet in a glass tube, pass the tube into the mercury cathode, withdraw the tube and the particles clustered about it, and remove the magnet, whereby a free slurry of particles and mercury is left. Subsequently, the slurry is heat-treated for a few minutes at 200° C., and after a cooling to room temperature, a trace of tin or other suitable plating material, such as zinc, aluminum, manganese, nickel, antimony, or another metal which compounds with iron, is added to occasion a metal coating of the elongated particles. Further removal of iron from the mercury is then accomplished by oxidizing the iron at the mercury interface in air or another oxidizing agent. Removal of the last traces of mercury occurs in a washing and vacuum- or hydrogen-baking at a low temperature, the particulars of such removal being detailed later herein. Thereafter, a dry mix of the elongated iron particles with a filler and binder such as an organic thermoplastic or non-magnetic metal, such as lead or a lead alloy, is performed, and the finished magnet is produced by alignment of the elongated particles in a D.-C. magnetic field preferably of 4,000 gauss or more and by a pressing or casting to realize the desired particle packing. Mercury removed from the slurry may be purified and returned to the cathode pool for further use. Reproducibility is excellent with this process, the required equipment is not complex, rather low temperatures are used throughout, and the principal raw material is common ingot iron for the anode of the electrodeposition apparatus.

Figure 3:
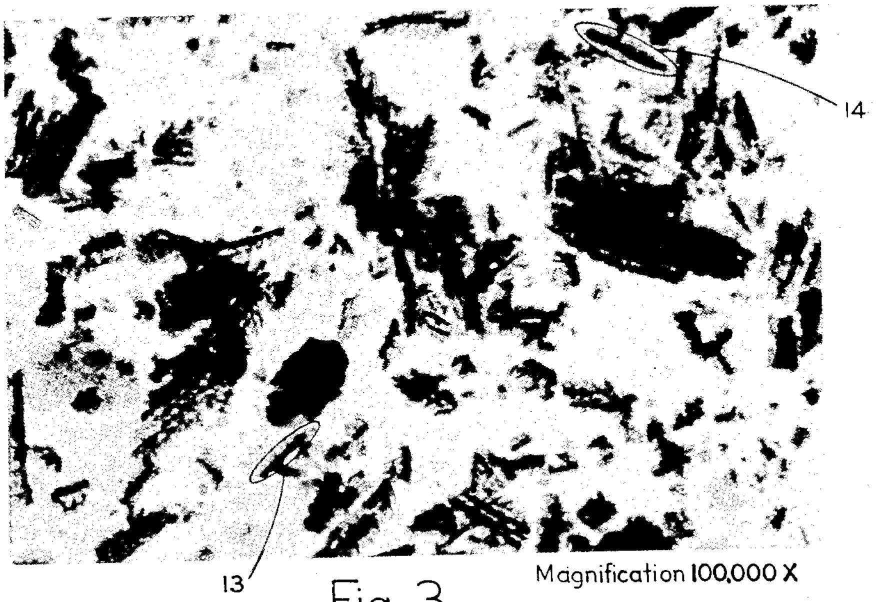
Figures 3 through 8 are photomicrograph representations of fine-particle iron magnet materials.

Elongated iron particles are shown in the electron photomicrograph of Figure 3 just as produced in the electrodeposition operation using an iron chloride electrolyte at room temperature, without heat or metal treatment, but with a light oxidation to facilitate mercury removal. Coercive force was not greatly altered by this oxidation and removal procedure. These particles were magnified 100,000 diameters, and the extraordinarily detailed photograph possessed a resolution of 20 angstrom units (just seven times the diameter of an individual iron atom). The main body of each particle is about 150 angstrom units in cross-sectional diameter. Encircled representative particles 13 and 14 are identified in Figure 3 as an aid in interpretation, and it should be appreciated that many of the particles are not aligned such that they can be viewed from the side, and others are closely bunched. Coercive force and directionality of the particles at this stage are relatively low, it being expected that this is due to deleterious effects of the feather-like branches or dendrites which can be clearly seen directed outwardly from the main body of each iron particle. These dendrites branch upward in the direction of particle growth and they may effectively increase the particle dimensions beyond the desired maximum values.

Figure 4:
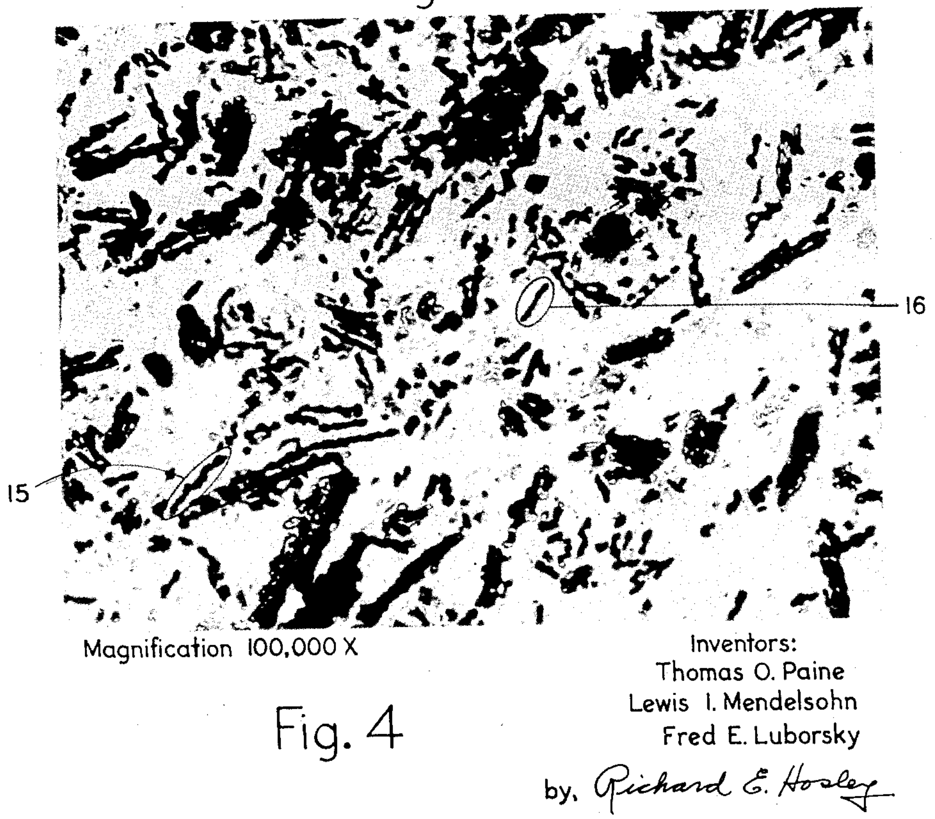

When the heat and metal treatments of these particles have been performed, the coercive force and directionality are greatly enhanced. Metal-coating is believed to benefit the coercive force by keeping the particles separated with non-magnetic material. The electron photomicrograph of Figure 4 illustrates these heat-treated and tinned particles, and it is immediately apparent that the feather like dendritic appendages have been largely removed, leaving the particles in the more rod-like elongated forms which are essential to realization of desired shape anisotropy effects. The particle cross-sectional diameters do not change appreciably. Representative individual particles 15 and 16 have been encircled.

Figure 5:
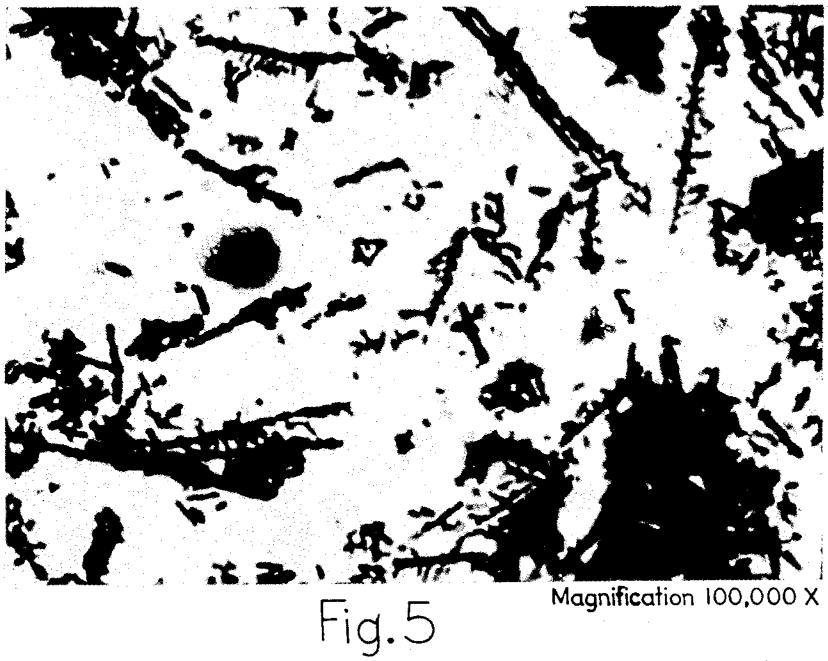
Figure 6:

Using an electrolyte having ethylene glycol, and performing the electrodeposition at the higher temperature of 170° C., iron particles were produced having the structures viewed in the electron photomicrographs of Figures 5 and 6. Large elongations were achieved, and the pronounced dendritic formations are readily perceived.

Figure 7:
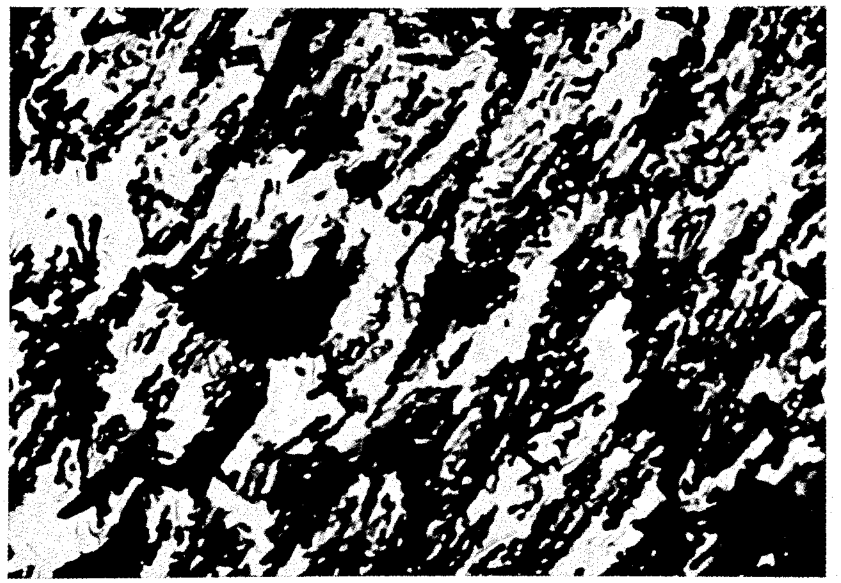

Figure 7 is an electron photomicrograph of a section of a pressed magnet, most of the mercury having been removed and the elongated particles aligned in a magnetic field. A high degree of particle alignment has obviously been achieved. Any error in the density of particle packing is in the low direction, inasmuch as a pseudo-replica photographing technique was employed. That is, to facilitate electron photomicrographing, another material was pressed against the magnet surface and then photographed. Accordingly, voids in the reproduction may actually have contained particles which were not picked up in this reproduction process.

Figure 8:
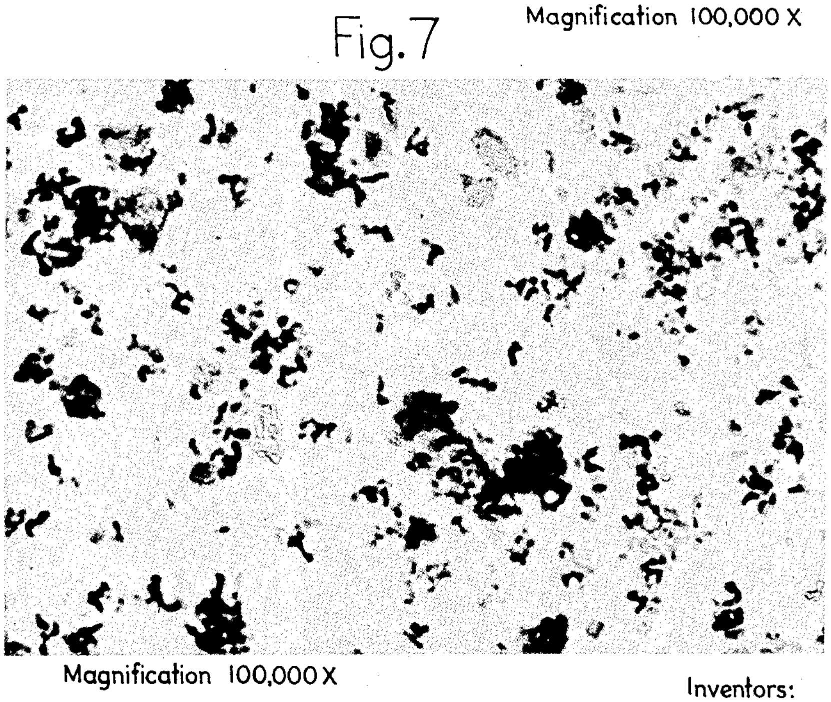

That elongated particle shape is related to the quiescent electrolyte-cathode interface condition is demonstrated by the results obtained under like circumstances with the exception that the interface is agitated during electrodeposition. Such agitation occasions nucleation and growth of substantially spherical iron particles, rather than those of suitable elongated form, and subsequent heat treatment of the spherical particles causes them to grow in size, but only as substantially spherical particles. Figure 8 pictures these essentially round or spherical particles produced in this manner, which is in accordance with teachings of the prior art, and having diameters of about 150 angstroms, this diameter being the one which yields optimum coercive force for particles of such shape. The coercive force is nevertheless poor as compared with that for our critically-elongated iron particles, because crystal anisotropy effects are alone present. While heat treatment of the round particles causes them to grow in diameter, our elongated iron particles behave differently in that they first shed their dendritic appendages to become more purely rod-like, without appreciable alteration of their cross-sectional diameters.

Figure 9:
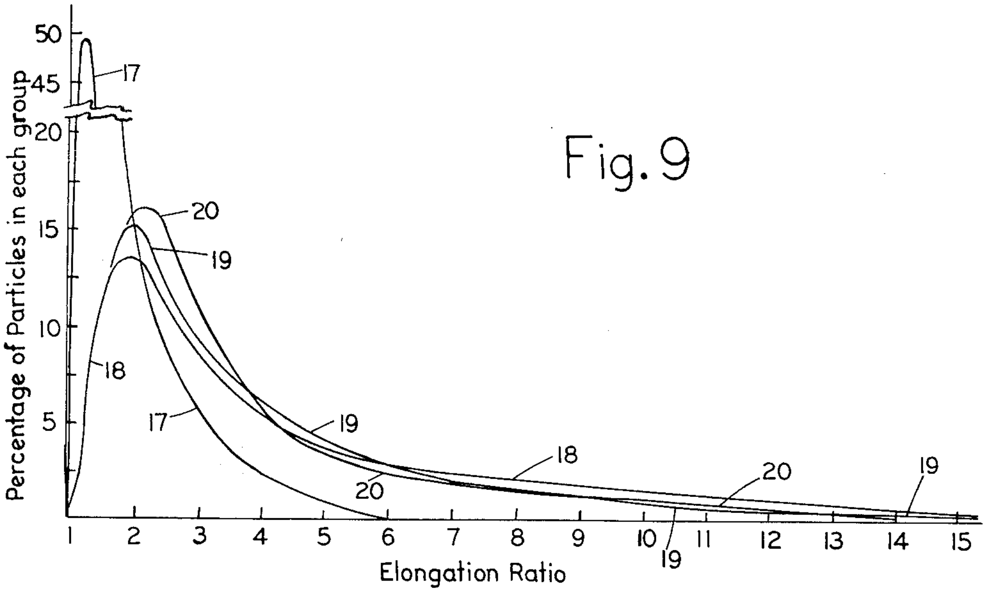
Figure 9 is a plot of percentages of particles vs. elongation ratio for particles in material samples illustrated in Figures 4, 5, 6 and 8.

In quantitative studies of the photomicrograph information, particle elongations of various samples have been closely ascertained. These elongations are plotted in Figure 9, which bears an ordinate in terms of percentages of particles counted in each of a photographed group or sample and an abscissa in terms of elongation ratio. Curve 17 indicates that the median particle length to diameter ratio is only 1.3 to 1 for the substantially spherical iron particles of Figure 8. For the particles shown in Figure 4 and plotted in curve 18, the greatest number possessed elongations of 2 to 1, with the median elongation being about 2.7 to 1. Peak percentages of elongations for particles of the sample of Figure 5 and curve 19 are about 1.9 to 1, and their median elongation is about 3.0 to 1. Particles of the sample of Figure 6 and curve 20 possessed peak percentages of 2.2 to 1 elongations and a median elongation of 2.7 to 1. The distinctly elongated iron particles of the samples of Figures 4, 5, and 6 included a number having elongations as great as 16 to 1, while the accidentally-elongated particles in the sample of Figure 8 had maximum elongations of only up to 6 to 1. Accordingly, a median elongation ratio of 1.5 to 1 characterizes our intentionally elongated particles as falling distinctly beyond the possible accidental elongations of prior substantially round particles, and further, at least half of our elongated particles possess elongation ratios of at least 2 to 1.

Figure 10:
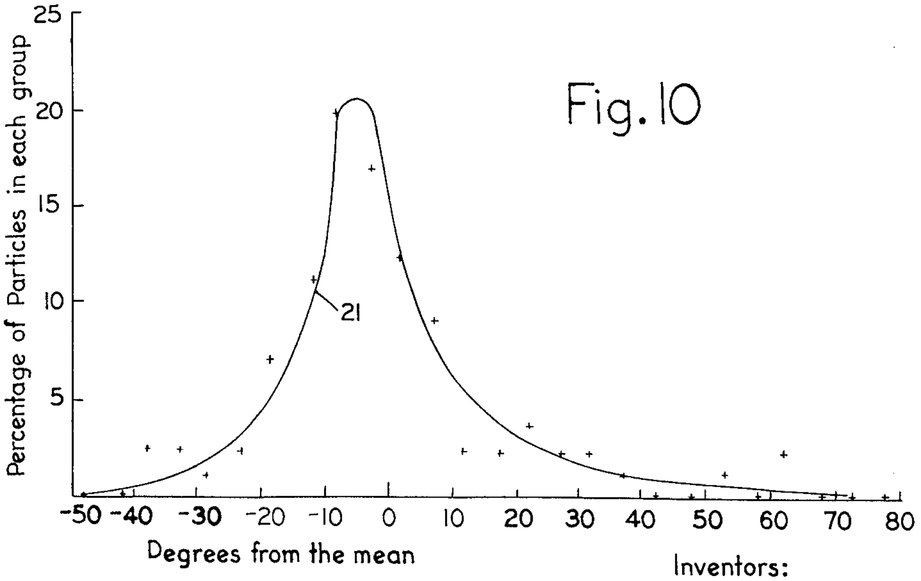
Figure 10 is a plot of percentages of particles vs. degrees from the mean orientation in the directionalized material represented in the photomicrograph of Figure 7.

Figure 10 presents directionality information concerning the material appearing in Figure 7. Curve 21 in Figure 10 is a plot of percentages of particles in each group of orientations within 5 degree ranges vs. particle orientations in degrees from the mean alignment orientation. Although only a portion of the analyzed sample surface has been duplicated here in Figure 7, because of space limitations, a counting and angle measurement of particles including particles of Figure 7 indicates that the degree of particle alignment is about 94%. As was noted hereinbefore, such alignment results from a pressing operation conducted in a magnetic field, and the importance of success in this procedure is emphasized by the facts that squareness of the demagnetization curve and the value of the energy product of the magnet depend upon particle alignment. The difference between this 94% alignment and the magnetic directionality characterized by an 81% ratio of residual flux density to saturation flux density (*Br/Bs*) for the sample is probably due to the presence of some agglomerates and small spherical particles. The residual flux density "B*r*," as is well known, is that flux density remaining after the peak magnetizing force H has been reduced to zero and the saturation flux density B*s* is the maximum intrinsic induction possible in a material. As has been stated earlier, such directionalization cannot be effected with rounded single-domain iron particles. The unusually high energy products obtained with our magnet material is dependent upon this directionalization.

As the elongated particles are compacted to form a magnet, two effects are observed: first, the saturation and residual induction increase as the particles are pressed closer together, due to the greater iron concentration; and second, the coercive force of particles decreases with increased packing, due to particle magnetic interactions. At theoretically infinite particle dilution the saturation induction of a sample would be zero, but the coercive force would have the highest possible value. On the other hand, the saturation induction would be that of the bulk material (21,600 gauss for iron) and the coercive force would be zero when a full or 100% packing obtains. The maximum energy product is believed to occur with an intermediate packing of about ½ to ⅔; that is, when there are about ½ to ⅔ of the theoretically possible number of elongated particles distributed uniformly per unit of volume of the magnet material.

Figure 11:
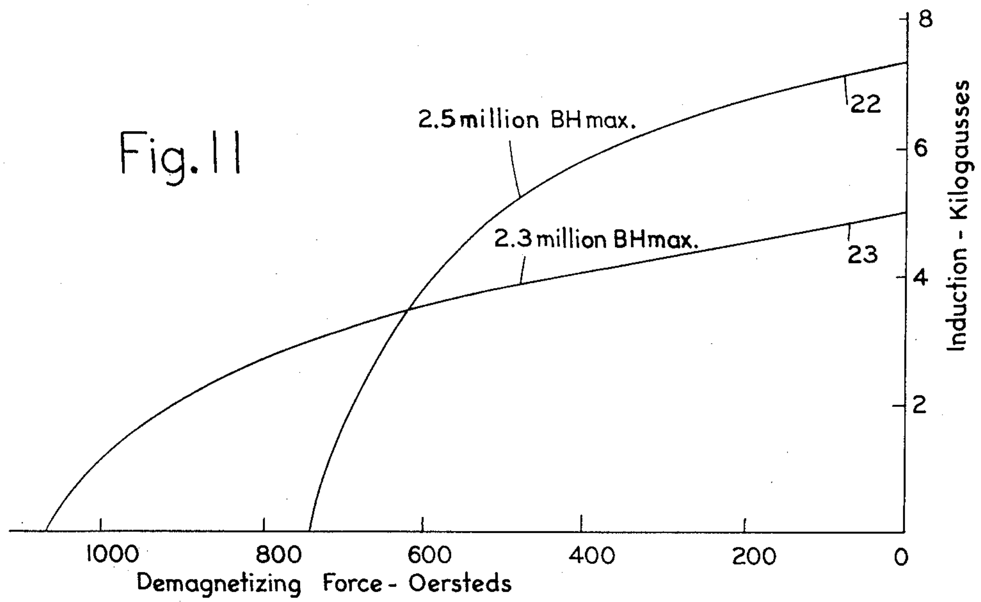
Figures 11 and 12 are plots of induction vs. demagnetizing force for elongated iron particles of different packing and different directions of magnetization, respectively.

The gain in residual induction at expense of lowered coercive force which occurs with increased packing is apparent from the curves in Figure 11, wherein induction in kilogausses vs. demagnetizing force in oersteds is plotted for two magnet samples. Curves 22 and 23 were obtained with samples which had been compacted under pressures of 44,000 and 22,000 pounds per square inch, respectively, and it is observed that the higher residual induction of the more compacted sample is accompanied by a coercive force which is less than that of the less compacted sample. The degrees of magnetic directionality can be appraised from the squareness of the demagnetization curves, and directionality is seen to be superior in the case of the more compacted sample represented by curve 22.

Figure 12:
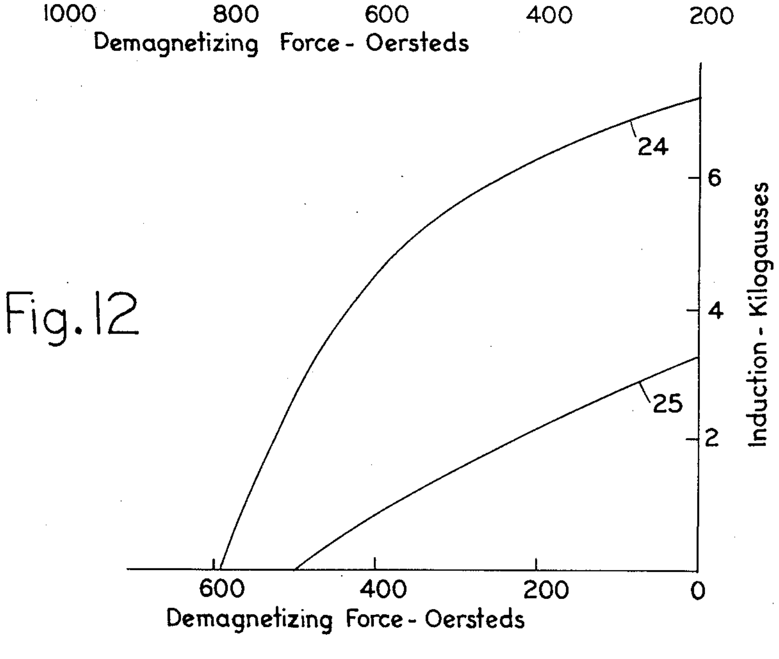

Directionality effects are also evidenced by curves 24 and 25, in Figure 12, which plot induction in kilogausses vs. demagnetizing force in oersteds for like magnet samples wherein the direction of magnetization was parallel to the particle alignment direction, in the case of curve 24, and perpendicular to the particle alignment direction in the instance of curve 25. Both residual induction and coercive force are higher for the material magnetized in the direction of particle alignment, and the energy product is also very much greater. The unusual degree of directionality which we have obtained with our elongated particles contributes substantially to the very high energy products of our magnets.

It has been noted earlier herein that the shape anisotropy effects of the elongated iron particles are dominant, and that the crystal anisotropy effects (which limit the magnetic qualities of material principally including substantially spherical particles) are relatively minor. With iron particles having substantial elongations, that is, elongations greater than the 1.3 to 1 median elongation which can be found in accidental occurrence in samples having substantially spherical particles, there is, very desirably, a large external magnetic field for each particle. Each particle evidences that it has opposite magnetic poles at its ends, even though the particle lengths are preferably much greater than the domain boundary dimension of iron and it might be expected that sections of different magnetic orientations would be accommodated along the particles. This simple magnetic polarization, which causes each particle to behave as though it were a minute bar magnet, is what is believed to occasion the advantageously large external fields for the elongated particles. It is also in this connection that the limits in cross-sectonal diameter of the critically-shaped iron particles are important. With a cross-sectional particle diameter about the same as or somewhat less than the iron domain boundary dimension, i.e., 840 angstroms, any reversals in magnetic orientations as between different portions of any one elongated particle would necessitate magnetic orientations in intermediate portions of the particle which are highly unstable. The natural seeking of most balanced magnetic conditions which characterizes most materials then comes into play to cause but a single orientation of magnetic forces in each particle. This effect appears even with elongated iron particles having maximum diameters equal to or slightly in excess of the iron domain boundary dimension, such that substantial elongation of these particles also yields the benefits of shape anisotropy. The limiting maximum diameter is about 1,000 angstroms, and particles thicker than this do not reliably remain as single-magnetic domains. It is not essential that the elongated iron particles have uniform cross-sectional diameters along their entire lengths, however, provided the maximum median diameter is not greater than the aforesaid 1,000 angstrom value, and the particles may take the form of ellipsoids, for example. With transverse dimensions below about 100 angstroms, the average particles contain so few iron atoms that thermally-induced fluctuations of the magnetic moments will cause random reversals of the particle magnetizations in short periods of time, as can be shown statistically. This leads to poor magnet properties because the particles will not maintain the imposed magnetic directionalities, and effectively, the particles have low coercive force. A lower limit for median transverse dimensions is thus found at about 100 angstroms.

In the electrodeposition operation, the current density is found to influence the appearance of the resulting elongated iron particles. By way of illustration, with a low plating current density of 0.005 ampere per square centimeter, and at a 25° C. temperature with an iron chloride electrolyte, the iron particles are highly elongated but contain closely-spaced branching dendrites giving them a feathered appearance. In one case, these dendrites were found to have an average length of 330 angstroms and an average separation of 250 angstroms. With a higher current density of 0.045 ampere per square centimeter, however, the iron particles are shorter and the dendritic formation less feathery. One measurement disclosed that the dendrites for these particles had average lengths of 240 angstroms and a separation approximating 150 angstroms. The range of current densities between about 0.005 ampere per centimeter and the values at which continuous-sheet plating occurs or about 5 amperes per square centimeter is useful in our process, the dendritic formations becoming less feathery as the current density is increased.

Plating current density also affects the iron particle coercive force, both in the as-plated condition of the particles and after they have received heat treatment. While it has been stated that lower plating current densities produce as-plated particles with greater elongation than is realized with certain higher current densities, it has been found that subsequent heat treatment of the particles plated at the lower current densities does not develop as great coercive forces or as pronounced magnetic directionalizations as can be achieved with heat-treated particles plated under influence of the higher current densities.

Heat treatment of the as-plated elongated iron particles in a mercury slurry is effective to cause progressive changes in their shape and characteristics. At first, the dendritic structures become less feathery and tend to disappear, probably through dissolving and depositing upon the main bodies of the particles, and somewhat lumpy elongated particles remain. At this point, the iron particles have a very high coercive force and magnetic directionality. Thereafter, higher temperatures and longer treatments cause the particles to grow together into large substantially spherical bodies, with an attendant sharp drop in coercive force. Temperatures up to 300° C. are satisfactory in the heat treatment. Optimum magnets require that the iron particles be of single-domain size, with the maximum possible elongation, and with minimized dendritic attachments. Coating of the particles aids in achieving high coercive forces because the coatings prevent agglomeration of individual particles into masses having dimensions exceeding those desired.

The temperatures at which iron is deposited into a mercury cathode likewise have pronounced effects upon the characteristics of the iron particles formed. Room-temperature plating is characterized by the appearance of fine feather-like dendrites on the elongated particles, while much coarser and stubbier dendritic structures result at higher plating temperatures such as 170° C. and 230° C., and up to 300° C. The greater elongations and cross-sectional diameters yielded by plating at the higher temperatures also occasion higher coercive forces. Certain shape differences are noted; for example, some particles plated at 230° C. appear as thin plates, and do not have circular cross-sections. Remarkable elongations, as high as 40 to 1, have been observed at the very high temperatures, and the number of dendrites is advantageously reduced under these conditions.

Earlier herein it was noted that the last traces of mercury could be removed from a mass of elongated fine iron particles, in carrying out the disclosed processes. Such a procedure may be desirable to prevent the particles from becoming overly oxidized by air passing through the normally liquified mercury, for example. One suitable procedure involves a "washing" of the metal-coated elongated particles as they appear in the mercury slurry. Lead or a lead alloy, such as a lead-antimony alloy, is first added to the slurry, thereby reducing the mercury concentration. Next, a cluster of elongated particles is removed from the slurry with a permanent magnet. These two steps are repeated until the mercury concentration is as low as is wanted, and, in one instance, the dilution and magnetic concentration seven times left only 2% by weight of mercury in the resulting mass. Pressing of the mass at an elevated temperature slightly above the melting point of lead causes the lead to be extruded, such that the elongated particles can be given a desired concentration. Particle oxidation does not occur in the lead-particle mixture because the lead is normally in a solid state preventing oxygen from reaching the elongated particles. A second procedure for mercury removal involves heating the slurry of mercury and metal-coated elongated particles at a temperature of about 250° C. for about three hours under a vacuum of about one micron of mercury. The mercury is driven off, leaving the metal-coated particles substantially free of this substance. Above about 300° C., the particles, if stationary, tend to become sintered, with attendant destruction of their magnetic properties, but such a temperature may nevertheless be employed if the particles are agitated to prevent their sintering.

The aforementioned acids used with the electrolyte to maintain a scrupulously clean molten cathode surface during the electrodeposition operation act to prevent the precipitation of basic iron salts onto the cathode surface. Preferably, the electrolyte is made acid, with a pH of about 2. In one instance, precipitation in an iron chloride electrolyte was found to begin with a pH of about 4, in a concentration of about 1.6 mols of iron chloride per liter of solution, the balance being water and hydrochloric acid. Addition of an amount of hydrochloric acid reducing the pH to about 2 clearly eliminated this difficulty.

Of the non-magnetic filler or binder materials which may be employed in the production of finished magnetic material, organic thermoplastic materials have proven particularly useful. Cellulosics such as cellulose acetate and cellulose nitrate may be used, for example, as may acrylics, such as methyl methacrylate. In realizing optimum energy products, the volume of iron contributed by the elongated iron particles is preferably 50–66% of the volume of the finished magnetic material, the remaining volume being principally that of the filler or binder material, although a relatively small volume may be claimed by oxides and the metal coatings of the particles. Metal coatings for the particles may be related to the iron of the particles in the proportions of about 2–10%, by weight. Depending upon the magnetic properties sought for the magnetic material, the filler may comprise a lesser or greater percentage of the volume than the amounts noted. In using thermoplastic fillers and binders, the elongated iron particles may be placed into a plastic liquified by the presence of a solvent, the mass being placed in a mold and pressed while the elongated particles are aligned by an external field. Thereafter, the excess solvent may be driven off by a heating or vacuum-heating operation, leaving a rigid structure of the magnetic material. Alternatively, the elongated particles may be mixed with a hot molten thermoplastic material, and the mixture pressed while hot, in the presence of an aligning magnetic field, and then let cool. As a further alternative, a dry thermoplastic powder may be mixed with the elongated particles, and the mixture heated and pressed in the presence of the aligning field. Upon cooling, the preferred solid formation is achieved.

Directionalization, by alignment of the elongated fine iron particles, is preferably accomplished by an externally-applied D.-C. magnetic field of about 4,000 gauss or more. Weaker fields do not achieve optimum degrees of particle alignment, and higher fields tend to make the alignments more precise. Fields up to 28,000 gauss have proven wholly satisfactory.

In binding our elongated particles together in a solid mass, with non-magnetic material, packing pressures of any magnitude may be selected, depending upon concentrations wanted. The packing should not cause the particles to join their iron atoms and thereby destroy their single-domain characteristics, of course, and we have successfully used zero pressures and pressures up to and beyond 100,000 pounds per square inch. No packing pressure is applied when the elongated particles are merely cast or frozen in an alloy, such as a lead alloy having a low melting point.

The following is an example of a method for the preparation of one magnetic material in accordance with our teachings:

*Example I*

Electrodeposition of our elongated fine iron particles into a molten pure mercury cathode was performed at room temperature, using an ingot iron anode, a vibrationless spring mounting, a cathode-anode spacing of 1.5 centimeters, a plating current density of 0.045 ampere per square centimeter, and a 1.6 molal ferrous chloride electrolyte having hydrochloric acid and a pH of 3. Deposition continued for two minutes, with an iron-mercury slurry being removed thereafter using a permanent magnet. This run was then performed again in the same manner.

The coercive forces of these two slurries were measured, after freezing them while the particles thereof were aligned by a D.-C. magnetic field of 5,000 gauss. The coercive force of one measured parallel to the direction of particle alignment proved to be 510 oersteds, and 400 oersteds in the transverse direction. For the second, the coercive force in the parallel direction was 500 oersteds, and 400 oersteds in the transverse direction.

After these two slurries were heat-treated in air at 175° C. for 9 minutes, their coercive forces (H*ci*) being similarly measured:

| | H*ci* Parallel, oersteds | H*ci* Transverse, oersteds |
|---|---|---|
| Slurry #1 | 1,290 | 870 |
| Slurry #2 | 1,300 | 860 |

Both slurries were then mixed, and were metal-coated with tin by merely dropping a tin pellet into the mixture and then removing it. The coercive forces proved to be, upon freezing in a magnetic field:

| H*ci* Parallel, oersteds | H*ci* Transverse, oersteds |
|---|---|
| 1,670 | 1,075 |

Pressing the slurry while subjected to an aligning D.-C. magnetic field of 3,000–5,000 gauss was next performed, at a pressure of 61,000 pounds per square inch. Excess mercury was removed in this operation. The resulting magnetic material, pictured in Figure 7, possessed these properties:

Coercive force—650 oersteds
Residual flux density—7150 oersteds
Energy products (BH max.)—2.02 million gauss-oersteds
44% iron, by volume It has been found that the announced advantages of our material containing critical amounts of elongated iron particles can also be procured when atoms of metals other than iron are deposited together with the iron in such proportions that the particles yet retain the high saturation magnetization of iron. The mingling of atoms of most other materials with the iron atoms in the elongated particles is not generally advantageous, however, inasmuch as these other materials operate to reduce the energy product of the material including such elongated particles. An exception occurs in the instance of cobalt, and when cobalt atoms are mingled with iron atoms up to 75% cobalt and 25% iron ratio in our elongated particles, the saturation induction, coercive force, and energy product are all superior to the corresponding characteristics of like elongated particles of iron alone. Suitable processes are identical to those disclosed as productive of elongated iron particle materials, except that cobalt ions are introduced into the electrodeposition electrolyte. Cobalt salts may provide the cobalt ions, and it has been found satisfactory merely to add cobalt chloride to an iron chloride electrolyte in producing the desired particles. Cobaltous sulphate and cobaltous nitrate are examples of other salts which may also be used. The occurrence and behavior of our elongated particles containing cobalt atoms are not otherwise materially different from these phenomena associated with elongated particles having iron atoms only, and the cobalt-iron elongated particles possess crystal arrangements like those of iron particles. Prior investigations of the use of iron-cobalt particles have yielded only the substantially spherical particles, which cannot be directionalized and have therefore produced low energy magnets. Uniquely, however, our critically elongated particles each having both iron and cobalt atoms possess the much improved effects occasioned by shape anisotropy forces and, further, can be magnetically aligned to realize the heightened energy products resulting from directionalization.

An example of one production of our elongated particles including both iron and cobalt atoms follows:

*Example II*

Electrodeposition of our elongated fine iron-cobalt particles into a molten pure mercury cathode was performed at room temperature, using an ingot iron anode, a vibrationless spring mounting, a cathode-anode spacing of 1.0 centimeter, a plating current density of 0.303 ampere per square centimeter, and an electrolyte of 1.6 molal iron chloride and 0.4 molal cobalt chloride and having a pH of 2.5. Eight runs were achieved, each for 110 seconds, and the mercury-particle slurries which were each removed from the cathode magnetically were then mixed together. This mixture was next heated for 390 minutes at 175° C. Subsequently, the slurry measured:

| H*ci* Parallel, oersteds | H*ci* Transverse, oersteds |
|---|---|
| 1,670 | 1,210 |

The slurry mixture was then pressed at 98,750 pounds per square inch, removing much of the mercury, while an applied aligning field of 3,000–5,000 gauss was impressed. The resulting material possessed these properties.

Coercive force—843 oersteds
Residual flux density—7040 gauss
Energy product (BH max.)—2.17 million gauss-oersteds

| Composition, by weight: | Percent |
|---|---|
| Iron | 46.8 |
| Cobalt | 35.8 |
| Mercury | 8.3 |
| Oxides | Balance |

Molten cathodes other than pure mercury may be employed in the electrodeposition procedure, and molten or liquid alloys of mercury and other metals may be used, for example. Similarly, there are a number of electrolytes which those skilled in the art might select, iron chloride and ethylene glycol having been referred to as being illustrative of suitable vehicles for iron ions. Cathode alloys which can be hardened directly into solid masses at common temperatures, such as lead-mercury alloys, may be utilized in electrodepositions at high temperatures at which the alloys are molten. The elongated particles deposited under these conditions may then be left in the alloy, which becomes the finished magnet material when hardened. Preferably, directionalization of the elongated particles in this material is accomplished, by their alignment in a magnetic field while the alloy solidifies. Accordingly, it will be understood that while particular preferred embodiments of this invention have been shown and described herein, various changes and modifications can be accomplished without departing either in spirit or scope from the invention as set forth in the appended claims.

What we claim as new and desire to secure by Letters Patent of the United States is:

1. A magnetic material comprising elongated fine particles selected from the class consisting of (1) iron and (2) alloys of cobalt and iron in atomic ratios of up to about 3 to 1, at least half of said particles having elongation ratios of at least 2 to 1, the transverse dimension of each of said particles being that of a single magnetic domain.

2. A magnetic material comprising elongated fine particles of iron, at least half of said particles having elongation ratios of at least 2 to 1, the transverse dimension of each of said particles being that of a single magnetic domain.

3. A magnetic material comprising elongated fine particles of an alloy of cobalt and iron in atomic ratios of up to about 3 to 1, at least half of said particles having elongation ratios of at least 2 to 1, the transverse dimension of each of said particles being that of a single magnetic domain.

4. A magnetic material comprising elongated fine particles selected from the group consisting of (1) iron and (2) alloys of cobalt and iron in atomic ratios of up to about 3 to 1, at least half of said particles having elongation ratios of at least 2 to 1, the transverse dimension of each of said particles being that of a single magnetic domain and a protective material coating said particles.

5. A magnetic material comprising elongated fine particles selected from the class consisting of (1) iron and (2) alloys of cobalt and iron in atomic ratios of up to about 3 to 1, at least half of said particles having elongation ratios of at least 2 to 1, the transverse dimension of each of said particles being that of a single magnetic domain, a protective material coating said particles and a material binding said coated particles in magnetically oriented fixed spaced relationship such that the major axes of substantially all of said particles are substantially parallel.

6. A magnetic material comprising elongated fine particles of iron, at least half of said particles having elongation ratios of at least 2 to 1, the transverse dimension of each of said particles being that of a single protective magnetic domain, a material coating said particles and a material binding said coated particles in magnetically oriented fixed spaced relationship such that the major axes of substantially all of said particles are substantially parallel.

7. A magnetic material comprising elongated fine particles of an alloy of cobalt and iron in atomic ratios of up to about 3 to 1, at least half of said particles having elongation ratios of at least 2 to 1, the transverse dimension of each of said particles being that of a single magnetic domain, a protective material coating said particles and a material binding said coated particles in magnetically oriented fixed spaced relationship such that the major axes of substantially all of said particles are substantially parallel.

8. The method which comprises electrolytically depositing fine metal magnetic particles into a liquid metal cathode from an acidic electrolyte comprising ions selected from the class consisting of (1) iron ions and (2) mixtures of cobalt ions and iron ions in such molal ratios that the electrolytically deposited particles have cobalt to iron atomic ratios of up to about 3 to 1 while maintaining a quiescent interface between said cathode and said electrolyte whereby to produce magnetic material consisting essentially of elongated particles of metal selected from the class consisting of iron and cobalt-iron as above, at least half of which have elongation ratios of at least 2 to 1, the transverse dimension of each of said particles being that of a single magnetic domain.

9. The method which comprises electrolytically depositing fine iron particles into a liquid metal cathode while maintaining a quiescent interface between said cathode and an acidic electrolyte, whereby to produce magnetic material consisting essentially of fine elongated iron particles, at least half of which have elongation ratios of at least 2 to 1, the transverse dimension of each of said particles being that of a single magnetic domain.

10. The method which comprises electrolytically depositing fine metal magnetic particles into a liquid metal cathode from an acidic electrolyte containing ions of cobalt and ions of iron in such molal ratios that the electrolytically deposited particles have cobalt to iron atomic ratios of up to about 3 to 1 while maintaining a quiescent interface between said cathode and said electrolyte, whereby to produce in said cathode magnetic material consisting essentially of fine elongated magnetic particles as above, at least half of which have elongation ratios of about at least 2 to 1, the transverse dimension of each of said particles being that of a single magnetic domain.

11. The method which comprises electrolytically depositing fine metal magnetic particles into a liquid metal cathode from an acidic electrolyte comprising ions selected from the class consisting of (1) ions of iron and (2) mixtures of ions of cobalt and ions of iron in such molal ratios that the electrolytically deposited particles have cobalt to iron atomic ratios of up to about 3 to 1 while maintaining a quiescent interface between said cathode and said electrolyte, whereby to produce in said cathode magnetic material consisting essentially of fine elongated particles of metal selected from the class consisting of iron and cobalt-iron as above, at least half of said particles having elongation ratios of at least 2 to 1, the transverse dimension of each of said particles being that of a single magnetic domain, and coating said elongated particles with a protective material.

12. The method which comprises electrolytically depositing fine metal magnetic particles into a liquid metal cathode while maintaining a quiescent interface between said cathode and an acidic electrolyte comprising ions selected from the class consisting of (1) ions of iron and (2) mixtures of ions of cobalt and ions of iron in such molal ratios that the electrolytically deposited particles have cobalt to iron atomic ratios of up to about 3 to 1 whereby to produce in said cathode magnetic material consisting essentially of fine elongated particles of metal selected from the class consisting of iron and cobalt-iron as above, at least half of which have elongation ratios of at least 2 to 1, the transverse dimension of each of said particles being that of a single magnetic domain, coating said elongated magnetic particles with a protective material and fixing said elongated magnetic particles in magnetically oriented spaced relationship in which the major axes of substantially all of said particles are substantially parallel.

13. The method which comprises electrolytically depositing fine metal magnetic particles into a liquid metal cathode while maintaining a quiescent interface between said cathode and an acidic electrolyte comprising ions selected from the class consisting of (1) ions of iron and (2) mixtures of ions of cobalt and ions of iron in such molal relation that the electrolytically deposited particles have cobalt to iron atomic ratios of up to about 3 to 1, heat treating said particles at temperatures up to about 300° C. whereby to produce magnetic material consisting essentially of fine particles of metal selected from the class consisting of iron and cobalt iron as above, at least half of which have elongation ratios of at least 2 to 1, the transverse dimension of each of said particles being that of a single magnetic domain, coating said particles with a protective material, separating said particles from substantially all of said cathode material and bonding said particles into magnetically oriented fixed spaced relationship.

14. The method which comprises electrolytically depositing fine metal magnetic particles into a liquid metal cathode while maintaining a quiescent interface between said cathode and an acidic electrolyte comprising ions selected from the class consisting of (1) ions of iron and (2) mixtures of ions of cobalt and ions of iron in such molal ratios that the electrolytically deposited particles have cobalt to iron atomic ratios of up to about 3 to 1, heat treating said particles at temperatures up to about 300° C. whereby to produce magnetic material consisting essentially of fine elongated magnetic particles of metal selected from the class consisting of iron and cobalt-iron as above, at least half of which have elongation ratios of at least 2 to 1, the transverse dimension of each of said particles being that of a single magnetic domain, coating said particles with a protective material, removing said particles from substantially all of said cathode material and bonding said particles into magnetically oriented fixed spaced relationship in which the major axes of substantially all of said particles are substantially parallel.

15. The method which comprises electrolytically depositing at temperatures up to about 300° C. fine metal magnetic particles into a liquid metal cathode from an acidic electrolyte comprising ions selected from the class consisting of (1) iron ions and (2) mixtures of cobalt ions and iron ions in such molal ratios that the electrolytically deposited particles have cobalt to iron atomic ratios of up to about 3 to 1, while maintaining a quiescent interface between said cathode and said electrolyte, and a cathode current density of from about 0.001 ampere per square centimeter to about 5.0 amperes per square centimeter whereby to produce magnetic material consisting essentially of elongated particles of metal selected from the class consisting of iron and cobalt-iron as above, at least half of which have elongation ratios of at least 2 to 1, the transverse dimension of each of said particles being that of a single magnetic domain.

16. The method which comprises electrolytically depositing at temperatures of up to about 300° C. fine iron particles into a molten metal cathode while maintaining a quiescent interface between said cathode and acidic electrolyte, and a cathode current density from about 0.001 ampere per square centimeter to about 5.0 amperes per square centimeter whereby to produce in said cathode magnetic material consisting essentially of fine elongated iron particles, at least half of which have elongation ratios of at least 2 to 1, the transverse dimension of each of said particles being that of a single magnetic domain.

17. The method which comprises electrolytically depositing at temperatures up to about 300° C. fine metal magnetic particles into a molten metal cathode from an acidic electrolyte containing ions of cobalt and ions of iron in such molal ratios that the electrolytically deposited particles have cobalt to iron atomic ratios of up to about 3 to 1 while maintaining a quiescent interface between said cathode and said electrolyte and a cathode current density of from about 0.001 ampere per square centimeter to about 5.0 amperes per square centimeter, whereby to produce in said cathode magnetic material consisting essentially of fine elongated magnetic particles as above, at least half of which have elongation ratios of about at least 2 to 1, the transverse dimension of each of said particles being that of a single magnetic domain.

References Cited in the file of this patent

UNITED STATES PATENTS

| | | |
|---|---|---|
| 1,900,996 | Palmaer | Mar. 14, 1933 |
| 1,970,973 | Palmaer | Aug. 21, 1934 |
| 1,981,468 | Roseby | Nov. 20, 1934 |
| 1,982,689 | Polydoroff | Dec. 4, 1934 |
| 2,188,091 | Baermann | Jan. 23, 1940 |
| 2,239,144 | Dean et al. | Apr. 22, 1941 |
| 2,601,212 | Polydoroff | June 17, 1952 |
| 2,624,702 | De Merre | Jan. 6, 1953 |
| 2,694,656 | Camras | Nov. 16, 1954 |
| 2,825,670 | Adams et al. | Mar. 4, 1958 |
| 2,849,312 | Peterman | Aug. 26, 1958 |

FOREIGN PATENTS

| | | |
|---|---|---|
| 666,586 | Great Britain | Feb. 13, 1952 |

OTHER REFERENCES

J.A.C.S., vol. 25, pages 887–892 (1903).

"Powder Metallurgy," vol. 9; Selected Govt. Research Reports, issued by the Great Britain Ministry of Supply, London, 1951, page 78, Figure 2 facing page 79, and page 79.

UNITED STATES PATENT OFFICE
CERTIFICATE OF CORRECTION

Patent No. 2,974,104 March 7, 1961

Thomas O. Paine et al.

It is hereby certified that error appears in the above numbered patent requiring correction and that the said Letters Patent should read as corrected below.

Column 15, line 24, strike out "protective"; line 25, before "material" insert -- protective --.

Signed and sealed this 2nd day of January 1962.

(SEAL)
Attest:

ERNEST W. SWIDER
Attesting Officer

DAVID L. LADD
Commissioner of Patents